US012745194B2

(12) United States Patent
Madier et al.

(10) Patent No.: US 12,745,194 B2
(45) Date of Patent: Sep. 22, 2026

(54) IMPROVING THE QUALITY OF SERVICE OF CELL-EDGE USER EQUIPMENT WHEN SERVED BY A POWER LIMITED BASE STATION

(71) Applicant: Nokia Technologies Oy, Espoo (FI)

(72) Inventors: Louis Madier, Nozay (FR); Matha Deghel, Massy (FR); Karri Markus Ranta-Aho, Espoo (FI)

(73) Assignee: Nokia Technologies Oy, Espoo (FI)

( * ) Notice: Subject to any disclaimer, the term of this patent is extended or adjusted under 35 U.S.C. 154(b) by 213 days.

(21) Appl. No.: 18/843,926

(22) PCT Filed: Mar. 9, 2022

(86) PCT No.: PCT/EP2022/056005

§ 371 (c)(1),
(2) Date: Sep. 4, 2024

(87) PCT Pub. No.: WO2023/169667

PCT Pub. Date: Sep. 14, 2023

(65) Prior Publication Data

US 2025/0203534 A1 Jun. 19, 2025

(51) Int. Cl.
*H04W 52/36* (2009.01)
*H04W 36/30* (2009.01)
(Continued)

(52) U.S. Cl.
CPC ....... *H04W 52/367* (2013.01); *H04W 36/304* (2023.05); *H04W 52/245* (2013.01); *H04W 52/265* (2013.01)

(58) Field of Classification Search
None
See application file for complete search history.

(56) References Cited

U.S. PATENT DOCUMENTS

2016/0174232 A1* 6/2016 Krishnamoorthy ...... H04B 1/10 455/452.2
2018/0152848 A1* 5/2018 Egner .................. H04W 76/18
2023/0069579 A1* 3/2023 Al Tamimi ........ H04B 7/18504

FOREIGN PATENT DOCUMENTS

WO 2012/176010 A2 12/2012

OTHER PUBLICATIONS

"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.

(Continued)

*Primary Examiner* — Robert M Morlan
(74) *Attorney, Agent, or Firm* — Nokia Technologies Oy

(57) ABSTRACT

Techniques of determining whether to hand over a user equipment to a new base station include requesting power state information from a neighbouring base to see if the power state of the neighbouring BS is sufficient to serve a UE unable to be served by the current BS due to being in a minimum power mode, DL average power control Region #2. For example, when one BS enters DL average power control Region #2, the BS starts to coordinate with its neighbouring BSs to determine whether the neighbouring BSs are not in Region #2 and exchange segments information. The BS coordinates with UEs at a cell-edge to know if switching the UEs at the cell-edge to neighbouring BS(s) can improve their QoS (throughput).

21 Claims, 10 Drawing Sheets

(51) Int. Cl.
*H04W 52/24* (2009.01)
*H04W 52/26* (2009.01)

(56) References Cited

OTHER PUBLICATIONS

"3rd Generation Partnership Project; Technical Specification Group Radio Access Network; NR; Physical layer procedures for data (Release 16)", 3GPP TS 38.214, V16.7.0, Sep. 2021, pp. 1-172.
"3rd Generation Partnership Project; Technical Specification Group Radio Access Network; NR; Requirements for support of radio resource management (Release 17)", 3GPP TS 38.133, V17.3.0, Sep. 2021, 3207 pages.
"3rd Generation Partnership Project; Technical Specification Group Radio Access Network; NG-RAN; Xn application protocol (XnAP) (Release 16)", 3GPP TS 38.423, V16.7.0, Oct. 2021, pp. 1-466.
"Revised WID: Further enhancements on MIMO for NR", 3GPP TSG RAN Meeting #92e, RP-211586, Agenda: 9.7.1.1, Samsung, Jun. 14-18, 2021, 6 pages.
"3rd Generation Partnership Project; Technical Specification Group Radio Access Network; Evolved Universal Terrestrial Radio Access Network (E-UTRAN); X2 application protocol (X2AP) (Release 16)", BGPP TS 36.423, V16.7.0, Oct. 2021, pp. 1-502.
Törnevik et al., "Time Averaged Power Control of a 4G or a SG Radio Base Station for RF EMF Compliance", IEEE Access, vol. 08, Nov. 19, 2020, pp. 211937-211950.
International Search Report and Written Opinion received for corresponding Patent Cooperation Treaty Application No. PCT/EP2022/056005, dated Oct. 21, 2022, 14 pages.
Sun et al. "Reinforcement Learning based Handoff for Millimeter Wave Heterogeneous Cellular Networks", IEEE Global Communications Conference, Dec. 4-8, 2017, 6 pages.

* cited by examiner

200

300

IMPROVING THE QUALITY OF SERVICE OF CELL-EDGE USER EQUIPMENT WHEN SERVED BY A POWER LIMITED BASE STATION

RELATED APPLICATION

This application claims priority to PCT Patent Application No. PCT/EP2022/056005, filed Mar. 9, 2022, which is incorporated herein by reference in its entirety.

TECHNICAL FIELD

This description relates to telecommunications systems.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3d Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes receiving, by a first base station serving a first cell from a user equipment within the first cell, a message indicating a measure of power received from signals in a set of beams emitted by a second base station, the second base station serving a second cell adjacent to the first cell, the first base station operating under a minimum downlink power according to an average downlink power controller for a specified time interval. The method also includes determining, by the first base station, that the measure of power is sufficient for the user equipment to be served by the second base station with a quality of service greater than the minimum quality of service. The method further includes, in response to the determining, initiating, by the first base station, a handover of the user equipment from the first base station to the second base station.

According to an example implementation, an apparatus includes at least one processor and at least one memory including computer program code, the at least one memory and the computer program code configured to, with the at least one processor, cause the apparatus at least to receive, by a first base station serving a first cell from a user equipment within the first cell, a message indicating a measure of power received from signals in a set of beams emitted by a second base station, the second base station serving a second cell adjacent to the first cell, the first base station operating under a minimum downlink power according to an average downlink power controller for a specified time interval, the minimum downlink power being configured to guarantee a minimum quality of service to the user equipment. The at least one memory and the computer program code are also configured to, with the at least one processor, cause the apparatus at least to determine, by the first base station, that the measure of power is sufficient for the user equipment to be served by the second base station with a quality of service greater than the minimum quality of service. The at least one memory and the computer program code are further configured to, with the at least one processor, cause the apparatus at least to, in response to the determining, initiate, by the first base station, a handover of the user equipment from the first base station to the second base station.

According to an example implementation, an apparatus includes means for receiving, by a first base station serving a first cell from a user equipment within the first cell, a message indicating a measure of power received from signals in a set of beams emitted by a second base station, the second base station serving a second cell adjacent to the first cell, the first base station operating under a minimum downlink power according to an average downlink power controller for a specified time interval. The apparatus also includes means for determining, by the first base station, that the measure of power is sufficient for the user equipment to be served by the second base station with a quality of service greater than the minimum quality of service. The apparatus further includes means for, in response to the determining, initiating, by the first base station, a handover of the user equipment from the first base station to the second base station.

According to an example implementation, a computer program product includes a computer-readable storage medium and storing executable code that, when executed by at least one data processing apparatus, is configured to cause the at least one data processing apparatus to receive, by a first base station serving a first cell from a user equipment within the first cell, a message indicating a measure of power received from signals in a set of beams emitted by a second base station, the second base station serving a second cell adjacent to the first cell, the first base station operating under a minimum downlink power according to an average downlink power controller for a specified time interval, the minimum downlink power being configured to guarantee a minimum quality of service to the user equipment. The computer-readable storage medium also stores executable code that, when executed by at least one data processing apparatus, is configured to cause the at least one data processing apparatus to determine, by the first base station, that the measure of power is sufficient for the user equipment to be served by the second base station with a quality of service greater than the minimum quality of service. The computer-readable storage medium further stores executable code that, when executed by at least one data processing apparatus, is configured to cause the at least one data processing apparatus to, in response to the determining, initiate, by the first base station, a handover of the user equipment from the first base station to the second base station.

According to an example implementation, a method includes receiving, by a first base station serving a first cell from a second base station serving a second cell adjacent to the first cell, a message requesting a status of the average downlink power controller of a segment of a hemisphere surrounding the first base station, the second base station operating under a minimum downlink power according to an average downlink power controller for a specified time interval, the minimum downlink power being configured to guarantee a minimum quality of service to the user equipment. The method also includes, transmitting, by the first base station, a message to the second base station indicating that the average downlink power controller of the segment is sufficient for the user equipment to be served by the second base station with a quality of service greater than the minimum quality of service. The method further includes, in response to the message indicating that the average downlink power controller of the segment is sufficient for the user equipment to be served by the second base station, receiving, by the first base station, a message indicating that a handover of the user equipment from the second base station to the first base station has been initiated.

According to an example implementation, an apparatus includes at least one processor and at least one memory including computer program code, the at least one memory and the computer program code configured to, with the at least one processor, cause the apparatus at least to receive, by a first base station serving a first cell from a second base station serving a second cell adjacent to the first cell, a message requesting a status of the average downlink power controller of a segment of a hemisphere surrounding the first base station, the second base station operating under a minimum downlink power according to an average downlink power controller for a specified time interval, the minimum downlink power being configured to guarantee a minimum quality of service to the user equipment. The at least one memory and the computer program code are also configured to transmit, by the first base station, a message to the second base station indicating that the average downlink power controller of the segment is sufficient for the user equipment to be served by the second base station with a quality of service greater than the minimum quality of service. The at least one memory and the computer program code are further configured to, in response to the message indicating that the average downlink power controller of the segment is sufficient for the user equipment to be served by the second base station, receive, by the first base station, a message indicating that a handover of the user equipment from the second base station to the first base station has been initiated.

According to an example implementation, an apparatus includes means for receiving, by a first base station serving a first cell from a second base station serving a second cell adjacent to the first cell, a message requesting a status of the average downlink power controller of a segment of a hemisphere surrounding the first base station, the second base station operating under a minimum downlink power according to an average downlink power controller for a specified time interval, the minimum downlink power being configured to guarantee a minimum quality of service to the user equipment. The apparatus also includes means for transmitting, by the first base station, a message to the second base station indicating that the average downlink power controller of the segment is sufficient for the user equipment to be served by the second base station with a quality of service greater than the minimum quality of service. The apparatus further includes means for, in response to the message indicating that the average downlink power controller of the segment is sufficient for the user equipment to be served by the second base station, receiving, by the first base station, a message indicating that a handover of the user equipment from the second base station to the first base station has been initiated.

According to an example implementation, a computer program product includes a computer-readable storage medium and storing executable code that, when executed by at least one data processing apparatus, is configured to cause the at least one data processing apparatus to receive, by a first base station serving a first cell from a second base station serving a second cell adjacent to the first cell, a message requesting a status of the average downlink power controller of a segment of a hemisphere surrounding the first base station, the second base station operating under a minimum downlink power according to an average downlink power controller for a specified time interval, the minimum downlink power being configured to guarantee a minimum quality of service to the user equipment. The executable code, when executed by at least one data processing apparatus, is also configured to cause the at least one data processing apparatus to transmit, by the first base station, a message to the second base station indicating that the average downlink power controller of the segment is sufficient for the user equipment to be served by the second base station with a quality of service greater than the minimum quality of service. The executable code, when executed by at least one data processing apparatus, is further configured to cause the at least one data processing apparatus to, in response to the message indicating that the average downlink power controller of the segment is sufficient for the user equipment to be served by the second base station, receive, by the first base station, a message indicating that a handover of the user equipment from the second base station to the first base station has been initiated.

According to an example implementation, a method includes transmitting, by a user equipment in a first cell served by a first base station from the first base station, a message indicating a measure of power received from signals in a set of beams emitted by a second base station, the second base station serving a second cell adjacent to the first cell, the first base station operating under a minimum downlink power according to an average downlink power controller for a specified time interval, the minimum downlink power being configured to guarantee a minimum quality of service to the user equipment; and. The method also includes receiving, by the user equipment, a message indicating an initiation of a handover from the first base station to the second base station with a quality of service greater than the minimum quality of service.

According to an example implementation, an apparatus includes at least one processor and at least one memory including computer program code, the at least one memory and the computer program code configured to, with the at least one processor, cause the apparatus at least to transmit, by a user equipment in a first cell served by a first base station from the first base station, a message indicating a measure of power received from signals in a set of beams emitted by a second base station, the second base station serving a second cell adjacent to the first cell, the first base station operating under a minimum downlink power according to an average downlink power controller for a specified time interval, the minimum downlink power being configured to guarantee a minimum quality of service to the user equipment. The at least one memory and the computer program code are also configured to receive, by the user equipment, a message indicating an initiation of a handover from the first base station to the second base station with a quality of service greater than the minimum quality of service.

According to an example implementation, an apparatus includes means for transmitting, by a user equipment in a first cell served by a first base station from the first base station, a message indicating a measure of power received from signals in a set of beams emitted by a second base station, the second base station serving a second cell adjacent to the first cell, the first base station operating under a minimum downlink power according to an average downlink power controller for a specified time interval, the minimum downlink power being configured to guarantee a minimum quality of service to the user equipment. The apparatus also includes receiving, by the user equipment, a message indicating an initiation of a handover from the first base station to the second base station with a quality of service greater than the minimum quality of service.

According to an example implementation, a computer program product includes a computer-readable storage medium and storing executable code that, when executed by at least one data processing apparatus, is configured to cause the at least one data processing apparatus to transmit, by a user equipment in a first cell served by a first base station from the first base station, a message indicating a measure of power received from signals in a set of beams emitted by a second base station, the second base station serving a second cell adjacent to the first cell, the first base station operating under a minimum downlink power according to an average downlink power controller for a specified time interval, the minimum downlink power being configured to guarantee a minimum quality of service to the user equipment. The executable code, when executed by at least one data processing apparatus, is also configured to cause the at least one data processing apparatus to receive, by the user equipment, a message indicating an initiation of a handover from the first base station to the second base station with a quality of service greater than the minimum quality of service.

The details of one or more examples of implementations are set forth in the accompanying drawings and the description below. Other features will be apparent from the description and drawings, and from the claims.

DETAILED DESCRIPTION

The principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Figure 1:
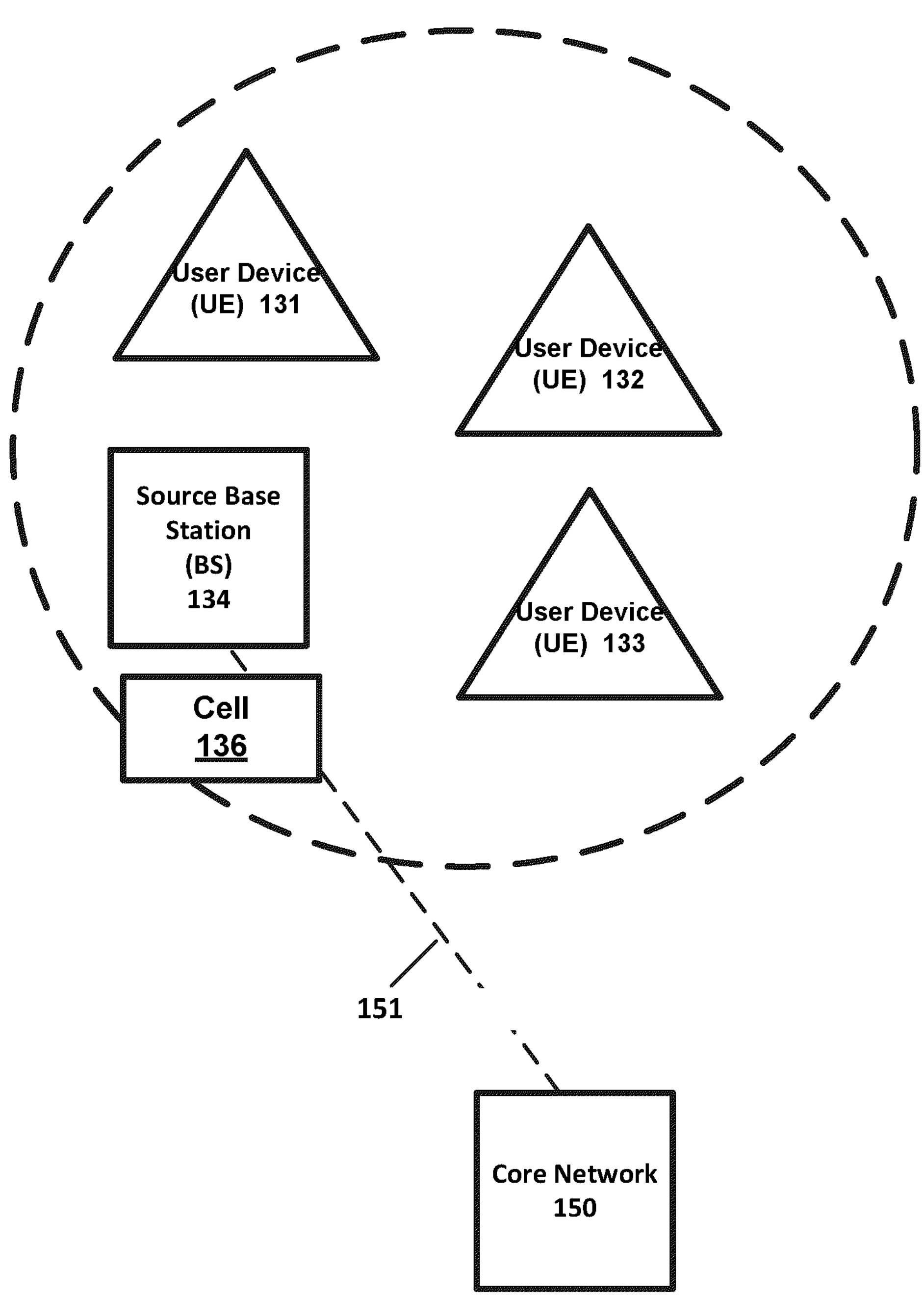
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including the user devices 131, 132 and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/serving cell change of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Some industry and consumer groups have expressed concern about potential health hazards of people being exposed to high doses of radiation near a cellular telephony base-station antenna. A manufacturer or other legal entity that will place a base station (BS) product on the market may be required to provide RF exposure information, including relevant compliance boundaries (exclusion zones), to the end user of the product.

In densely populated areas having BSs close to end users, it may be difficult to manage compliance distances to a BS. When people live, work, or play in the vicinity of the BS, controlling the radiation levels of the base station without impacting the throughput and/or Quality of Service (QoS) may pose a challenging task for BS operators.

In massive multiple-input multiple-output (MIMO), the base stations (BSs) are equipped with a very large number of radiating elements. Accordingly, many spatially separated users can be served with narrow and high gain beams. Focusing the transmit power into specific users' directions, however, poses new issues when performing a radio frequency (RF) exposure assessment. In fact, the spatial distribution of the actual BS transmit power strongly depends on the deployment scenario, the positions of the user, and the traffic load of each user.

In 5G, initial beam acquisition may be performed on a wide initial access beam containing the Synchronization Signal Block (SSB). These beams can be further refined (narrowed) for data transmission once the UEs are connected to the BS. However, the same beam width may be used for data transmission as it has been used for initial access transmission. The wide beams for access/data and the narrow beams for data are, in some cases, a set of predefined beams called Grid of Beams (GoB). On the one hand, one benefit of GoB is the reduction of baseband processing resources needed since the calculation of beamforming weights on the fly is very demanding on the computation power. On the other hand, the narrow beams used for data can be dynamic and generated on the fly in the directions of the users; these beams are known as Eigen Based Beams (EBB). In both cases, GoB or EBB, the BS knows the weight used to generate the beams and knows the individual radiating pattern of each radiating element. And from this knowledge the BS knows the directional radiated power in space at each time a transmission is happening. This knowledge is exploited at the BS to control the radiation in space based on human exposure limits to radio waves in a given direction. In general, the exposure limits specified in standards are represented as a limit on the maximum authorized average power density.

As previously stated, radiation level control at the BS may be performed using average downlink (DL) power controls. An average DL power controller can be implemented in any of several ways; nevertheless, in general such a power controller can be seen to have two main power regions.

- Region #1: Full DL power allowed. In this region the BS can use its maximum power ($P_{max}$) to serve its connected UEs traffic demands.
- Region #2: minimum DL power allowed. In this region BS uses minimum configured power ($P_{min}$) to serve its connected UEs traffic demands. Normally, $P_{min}$ is chosen to guarantee minimum quality of service (QoS) to BS connected UEs (to keep the connection alive with the connected UEs and have low traffic service).

In between these two regions any power level is allowed (based on the UE DL traffic demands) as long as the average power at the end of control window meets the configured average target.

It is noted that DL power controller can be applied per specific direction in space around the BS, or segment. A controller for each segment is used at the BS. The segments can be defined and configured by the operator before turning on the BS or generated on the fly by an algorithm inside the BS to track the DL beams and their emission in space. Space in a vicinity of the BS is assumed to be divided into many segments and the average power control is applied per segment with respect to a configured average power density level.

Figure 2A:
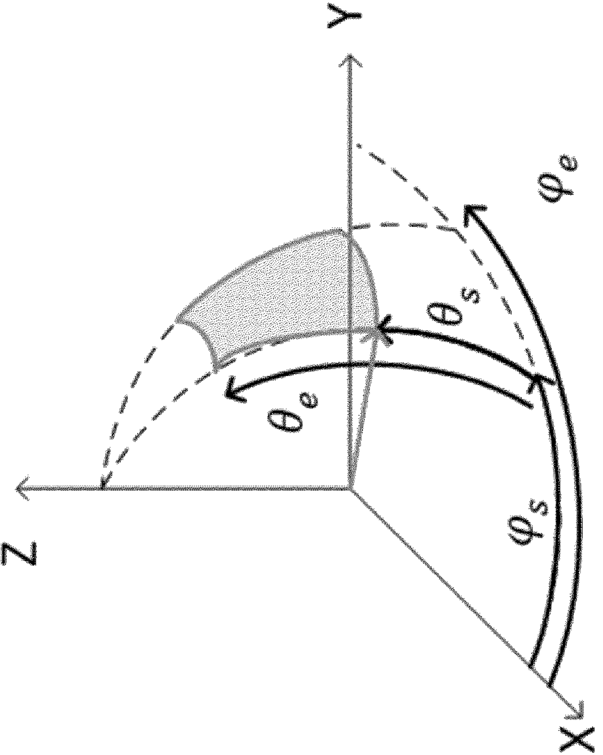
FIG. 2A is a diagram illustrating a segment of a sphere in 3D space surrounding a base station, according to an example implementation.

It is assumed that space around the BS is divided into segments. FIG. 2A is a diagram illustrating a segment 200 of a sphere in 3D space surrounding a base station. As shown in FIG. 2A, a segment may take the form of as solid angle defined over polar angles $\theta \in [\theta_s, \theta_c]$ and azimuthal angle $\phi \in [\phi_s, \phi_c]$.

Figure 2B:
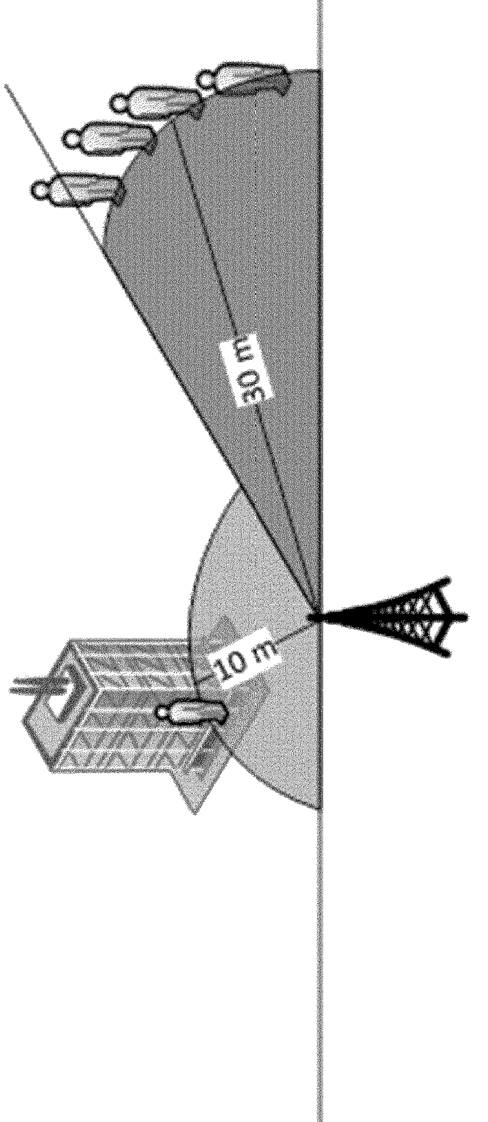
FIG. 2B is a diagram illustrating segments in relation to user devices served by a base station, according to an example implementation.

FIG. 2B is a diagram illustrating segments 250 in relation to user devices served by a base station. As shown in FIG. 2B, a building 10 ft from a base station is shown in one segment, while individual human users at 30 ft from the base station are in other segments. In the case shown in FIG. 2B, different power control levels could be used per segment because, for example, a human may be closer to the base station in one segment while further in another segment. In another case, different power control levels could be used per segment because, for example, beams are stronger in some segments while weaker on other segments.

Figure 3A:
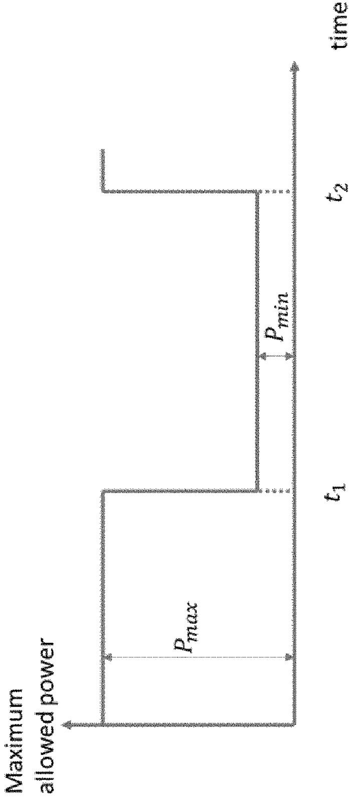
FIG. 3A is a diagram illustrating an output of an average downlink power controller, according to an example implementation.

FIG. 3A is a diagram illustrating an example 300 of average power controller of maximum allowed power. Between time $t_1$ and $t_2$ the BS is not allowed to transmit more power than $P_{min}$ (Region #2).

In some implementations, a DL power controller is applied per specific directions in space around the BS (segments). A controller for each segment is used at the BS. The segments can be defined and configured by the operator before turning on the BS or generated on the fly by an algorithm inside the BS to track the DL beams and their emission in space. The way those segments are configured and managed is out of scope of this work. However, space around the BS is assumed to be divided into many segments and the average power control is applied per segment to respect a configured average power density level.

It is noted that DL power controller can reduce the power used to transmit SSBs and/or channel state information reference signals (CSI-RSs). Nevertheless, it may not be recommended because it might reduce the coverage of the cells and cause non-desirable coverage holes. Accordingly, a conventional approach to determining whether to hand over a user equipment to a new base station to improve QoS includes applying the DL power controller on physical downlink shared channel (PDSCH) by reducing the transmitted power per Hz, or more advantageously maintaining the transmitted power per Hz, but reducing the bandwidth used to transmit the PDSCH. Both ways may lead to a lowered overall transmitted power as well as a reduced data rate. Reduction of the physical downlink control channel (PDCCH) transmit (Tx) power may not be recommended as the overall transmitted energy of the PDCCH is adapted to the user's link and reducing the Tx power from what is needed to reach the intended user may lead to loss of service.

Figure 3B:
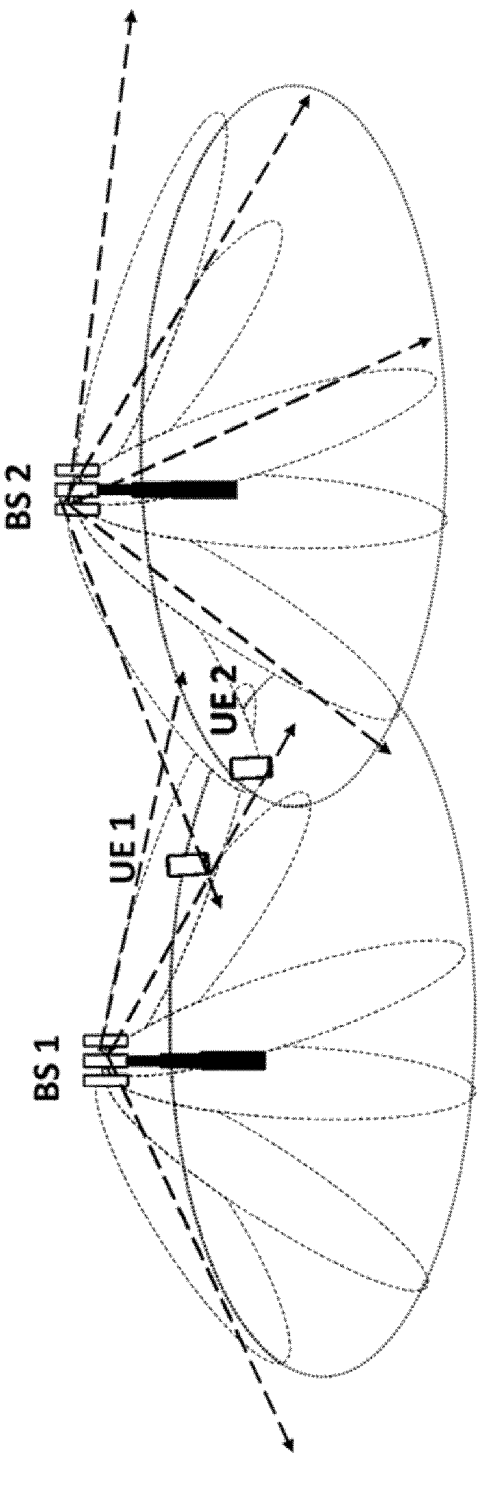
FIG. 3B is a diagram illustrating two base stations emitting different beams and having different average downlink power controllers, according to an example implementation.

Accordingly, a problem to be addressed is how one can improve the QoS of the UEs when their serving BS enters DL average power Region #2. FIG. 3B is a diagram illustrating a scenario 350 with two base stations BS1 and BS2 emitting different beams and having different average downlink power controllers. As shown in FIG. 3B, BS1 serves two UEs, UE1 and UE2. When BS1 is in region #2:

- UE1 QoS (throughput) will not be highly impacted since it has good channel conditions with BS1.
- UE2 QoS (throughput, and coverage) will be highly impacted as it is at the cell edge.

The QoS of UE2 could potentially be improved if we can offload the UE2 to a neighbouring BS. The problem of improving QoS has a dual: when the serving BS enters DL average power control region #2 (reduced Tx power) then how does one move the UEs experiencing low QoS to a neighbouring BS to improve their QoS, if such a neighbour is available and not in the DL average power control region #2.

In contrast to the conventional approach to determining whether to hand over a user equipment to a new base station to improve QoS, improved techniques include requesting power state information from a neighboring base station to see if the power state of the neighboring BS is sufficient to serve a UE unable to be served by the current BS due to being in DL average power control Region #2. For example, when one BS enters DL average power control Region #2 (i.e. low or minimum power control region), the BS starts to coordinate with its neighbouring BSs to determine whether the neighbouring BSs are not in Region #2, and exchange segments information. The BS coordinates with UEs at a cell-edge to know if switching the UEs at the cell-edge to neighbouring BS(s) can improve their QoS (throughput). In some implementations, the switching can be achieved by modifying handover-related measurement reporting thresholds to trigger a neighbour cell measurement report earlier. In some implementations, the switching can be achieved by requesting the UE to provide a neighbour cell measurement report. In some implementations, the BS, based on the collected measurements from UEs and configuration of the neighbouring BSs, determines whether it is beneficial to switch the UE neighbouring cell for a given amount of time (e.g., until the BS is no longer operating in Region #2).

The above-described improved technique for determining whether to hand over a user equipment to a new base station to improve QoS has advantages over the conventional approach, such as an improvement in the throughput and coverage of the UEs, especially cell-edge UEs, when their serving BS enters the DL average low power control region. By handing over a cell-edge UE when the serving BS is operating in Region #2 to another BS that operates in a higher DL average power control region and accordingly improving the QoS to the UE, a user of the UE has a better experience.

Figure 4:
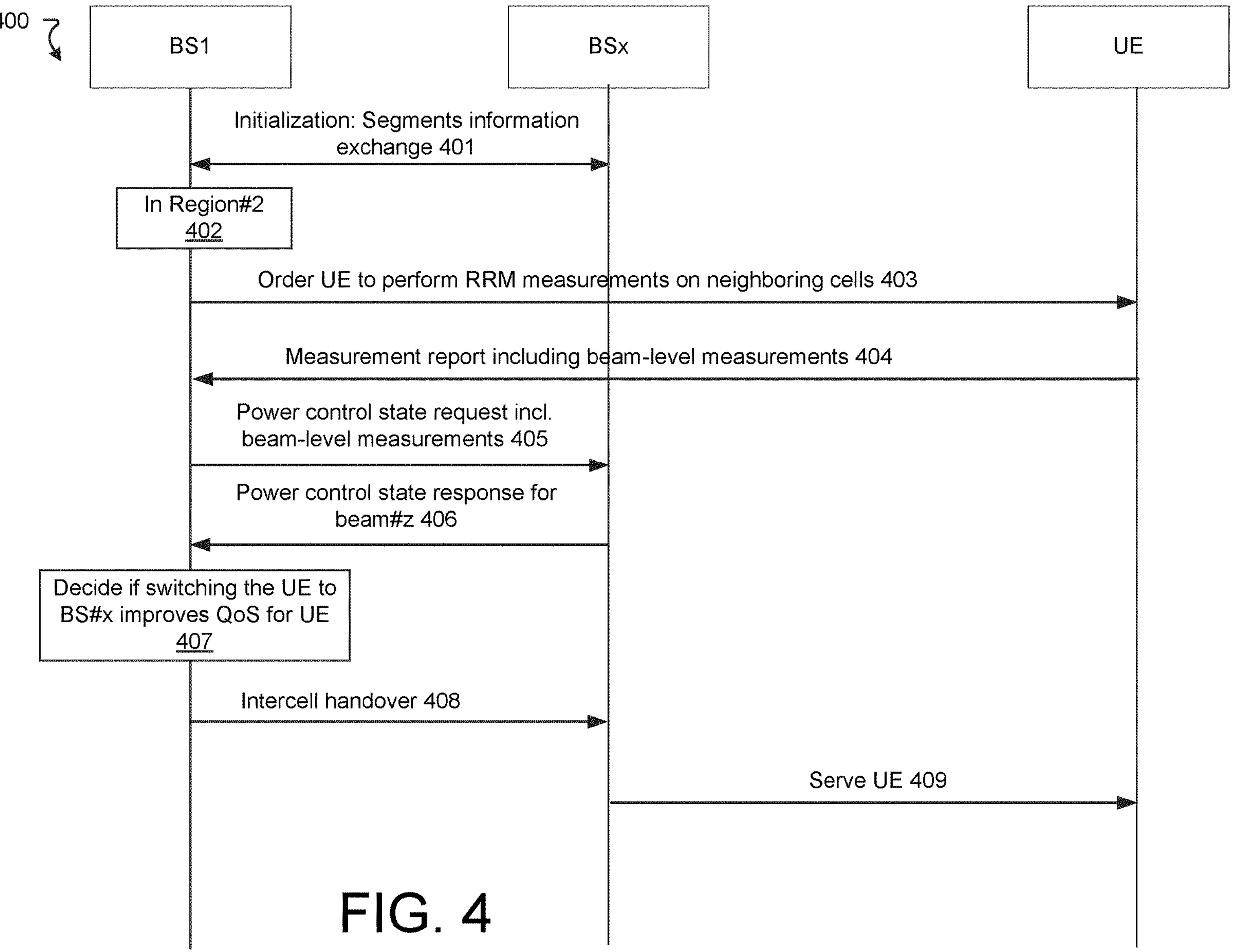
FIG. 4 is a sequence diagram illustrating a process of determining whether to hand over a UE from a first BS to a second BS, according to an example implementation.

FIG. 4 is a sequence diagram illustrating a process 400 of determining whether to hand over a UE on a cell-edge served by a first BS, BS1, to a second BS, BSx.

At 401, in some implementations, BS1 and BSx exchange information about their respective segments. For example, the BS1 and BSx may exchange or at least one BS may ask/provide another BS one or more of the following.

- Whether the segments are static (e.g., associated with one SSB beam) or dynamic (e.g., segments are created or their edges are recalculated each time a new beam is used);
  - If the segments are static, then exchange information such as line in spaces (or areas) which define the segments, power reduction factors applied to these segments and the corresponding durations (if any), etc.
  - If the segments are dynamic, then BS1 and BSx can exchange information such as algorithms used to update the segments, or exchange information regarding a segments schedule.

In some implementations, this initialization is performed using X2/XN interfaces or any other customized designed interface for the purpose.

In some implementations, the BS1 and BSx exchange beam information (indexes, types, PRACH occasion, etc.). In some implementations, 401 is done between the BSs to enable beam level handover to use contention-free random access (CFRA) procedure.

At 402, BS1 determines it is operating in DL average power control Region #2.

At 403, BS1 orders the UE at the cell-edge to perform measurements, e.g., RRM mobility measurements on neighbouring cells.

- In some implementations, the UE is configured with threshold-based neighbour cell measurement reporting to detect a need for handover. In such an implementation, the thresholds for these reporting triggers are modified.
- In some implementations, the gNB can request the UEs in the affected segment to report neighbour cell measurements.

At 404, BS1 receives from the UE a measurement report of beam level measurements, e.g., which is the best beam(s) the UE is seeing from BSx?

At 405, BS1 sends a request to BSx for a status of DL average power controller of the segment to which the UE reported beam(s) belongs.

- In some implementations, BS1 informs BSx that it has entered DL average power control Region #2 on a segment which intersects with the beam that the UE has reported. In some implementations, BS1 asks if BSx could serve the UE.

In some implementations, BS1 may also provide BSx the segment information and indicate whether the average power reduction is achieved by reduced transmission bandwidth. In some implementations, BS1 provides BSx with a part of the bandwidth that will be used (or not used) for PDSCH transmission, for inter-cell interference coordination purposes.

At 406, BS1 receives from BSx the status of DL average power controller of the segment to which the UE reported beam(s) belongs.

In some implementations, BSx informs BS1 that BSx is able to allocate power because BSx is not operating in DL average power control Region #2, or there are not many other UEs connected to the reported beam(s). In this case, BSx may receive UE1 (and any other similarly situated UE) on the reported beam(s). In some implementations, BSx reports a prediction of how much time is left before entering DL average power control Region #2 (with or without considering the expected traffic demand of the candidate UEs for QoS improvements).

At 407, BS1 determines whether to switch the UE to BSx. The determination may be based on any from the following non-exhaustive list:

- the measurement reports from the UE received at 404,
- the reports from BSx received at 406,
- a traffic demand experienced by the UE
  - can be determined from UE reports of buffer status.

In some implementations, the determination is performed algorithmically, for example:

- a machine learning algorithm which takes the reports from the UE and BSx as input; the output of the machine learning algorithm is a classification of whether the UE is handed over to BSx from BS1,
- a set of conditionals, for example:
  - if the UE (and other connected UEs) has a greater traffic demand than the DL average power control Region #2, and
  - if the UE reports a reference signal received power (RSRP) is greater than a specified threshold, and
  - if BSx reports of the status of DL average power controller is not blocking the handover,
- then perform a handover from BS1 to BSx.

At 408, BS1 hands over the UE to BSx. There are two options.

- Option 1: BS1 performs a handover procedure. The handover may be one of the following:
  - L1 level handover. In some implementations, the L1 level handover is combined with a timer configuration to tell the UE, especially if low mobility, when to switch back to its original serving cell.
  - L2/L3 level handover. In some implementations, the L1 level handover is combined with a timer configuration to tell the UE, especially if low mobility, when to switch back to its original serving cell.
  - Full handover. In this case, there is no need to provide the UE with a timer because the decision of switching back to the original serving cell is fully controlled by the new serving cell.
- Option 2: BS1 initiates a dual connectivity procedure. In some implementations, BS1 initiates an inter-BS carrier aggregation where only the control information is provided by the serving cell which is operating in DL average power control Region #2 and the data traffic is flowing from BSx.

In some implementations, 405 and 406 are performed prior to performing 403 and 404.

In some implementations, intercell multi-TRP context is considered where BS1 and BSx are transmission reception points (TRPs) associated with different Physical cell IDs (PCIs). In this case, the network may also use L1 measurements (such as L1-RSRP), corresponding to one or more TRPs, reported by the UE in the decision on whether and/or which cell or TRP to switch the UE.

In some implementations, the UE is configured or indicated (via RRC, MAC CE and/or DCI) to switch from BS1 to a BSx only for a certain period of time such as for the period of time corresponding to DL average power control Region #2 of the BS1. In this case, the UE may switch back to the BS1 afterward.

In some implementations, the UE determines whether to switch back to BS1 based on whether BS1 is still 'good' for this UE or not. The term 'good' here may refer to cases where L3 measurement and/or L1 measurement (corresponding to one or more beams) is greater than a predefined threshold.

In some implementations, the command for switching cell (BS or TRP) may be sent to a group of UEs at a time, for instance using group common PDCCH/DCI.

Figure 5:
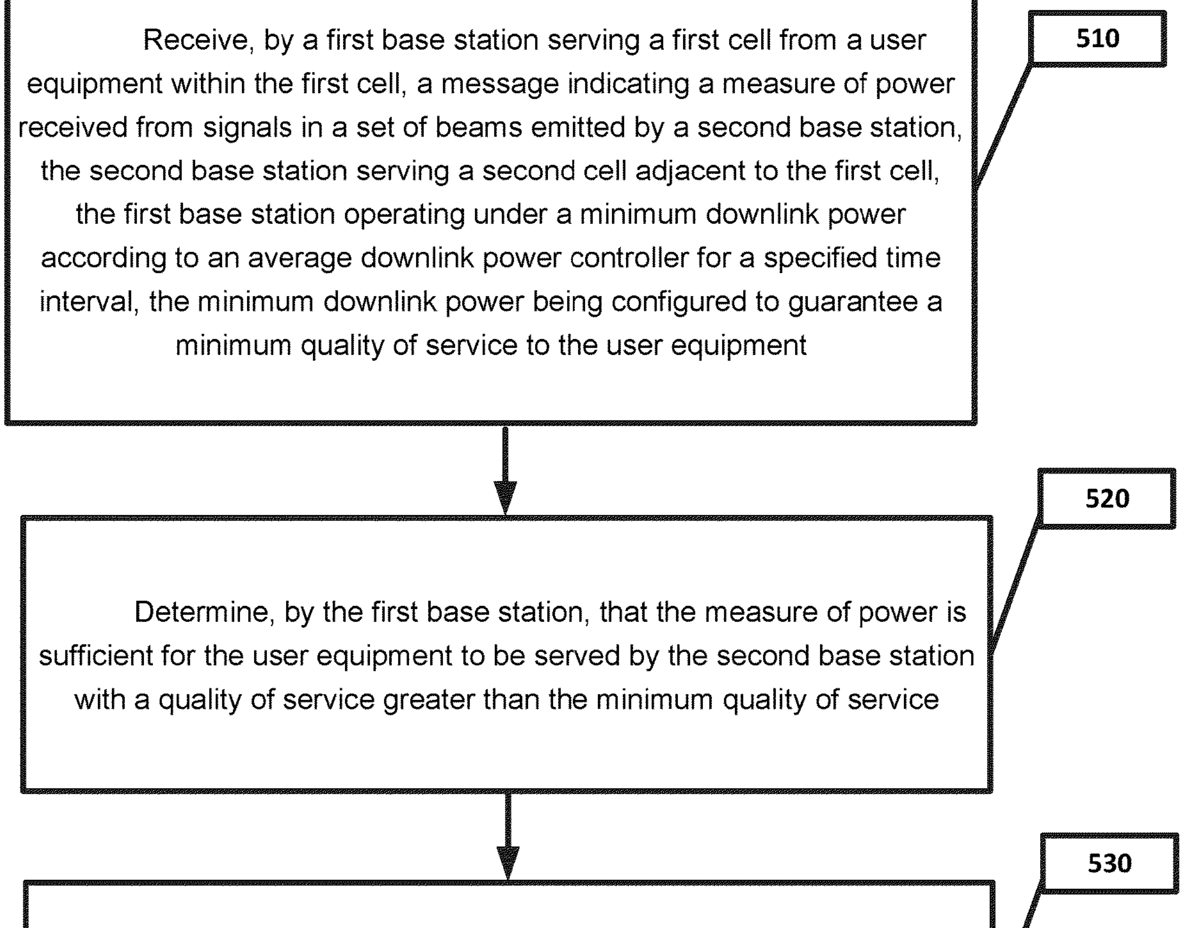
FIG. 5 is a flow chart illustrating a process of determining whether to hand over a user equipment to a new base station to improve QoS, according to an example implementation.

Example 1-1: FIG. 5 is a flow chart illustrating a process 500 of determining whether to hand over a user equipment to a new base station to improve QoS. Operation 510 includes receiving, by a first base station serving a first cell from a user equipment within the first cell, a message indicating a measure of power received from signals in a set of beams emitted by a second base station, the second base station serving a second cell adjacent to the first cell, the first base station operating under a minimum downlink power according to an average downlink power controller for a specified time interval, the minimum downlink power being configured to guarantee a minimum quality of service to the user equipment. Operation 520 includes determining, by the first base station, that the measure of power is sufficient for the user equipment to be served by the second base station with a quality of service greater than the minimum quality of service. Operation 530 includes, in response to the determining, initiate, by the first base station, a handover of the user equipment from the first base station to the second base station.

Example 1-2: According to an example implementation of example 1-1, wherein the measure of power indicates the downlink power according to the average downlink power controller is a maximum allowed power over at least a portion of the time interval.

Example 1-3: According to an example implementation of any of examples 1-1 and 1-2, wherein the minimum downlink power according to the average downlink power controller is based on a minimum quality of service guaranteed to the user equipment to maintain a connection with the first base station.

Example 1-4: According to an example implementation of examples 1-1 to 1-3, further comprising transmitting, to the second base station, a message requesting information concerning a segment of a hemisphere surrounding the second base station, over which the second base station transmits beams to the user equipment; and receive, from the second base station, a message identifying the segment over which the second base station emits the set of beams.

Example 1-5: According to an example implementation of example 1-4, wherein the message identifying the segment indicates that the segment is static in time.

Example 1-6: According to an example implementation of examples 1-4 to 1-5, wherein the message identifying the segment indicates that the segment is dynamic in time.

Example 1-7: According to an example implementation of example 1-6, wherein the message indicating that the segment is dynamic in time includes data representing an algorithm used to update the segments in time.

Example 1-8: According to an example implementation of any of examples 1-6 or 1-7, wherein the message indicating that the segment is dynamic in time includes data representing a schedule by which the segments are updated in time.

Example 1-9: According to an example implementation of examples 1-4 to 1-8, wherein the message identifying the segment indicates a first interval of polar angle over the hemisphere and a second interval of azimuthal angle over the hemisphere.

Example 1-10: According to an example implementation of examples 1-6 to 1-9, wherein determining that the measure of power is sufficient for the user equipment to be served by the second base station with a quality of service greater than the minimum quality of service includes transmit, to the second base station, a message requesting a status of the average downlink power controller of the segment; and receive, from the second base station in response to the message, a message indicating the status of the average downlink power controller of the segment, the determination of the measure of power is sufficient for the user equipment to be served by the second base station with a quality of service greater than the minimum quality of service being based on the status of the average downlink power controller of the segment.

Example 1-11: According to an example implementation of example 1-10, wherein the message indicating the status further indicates a power reduction factor applied to the segment.

Example 1-12: According to an example implementation of example 1-11, wherein the message indicating the status further indicates a time interval over which the power reduction factor is applied to the segment.

Example 1-13: According to an example implementation of any of examples 1-11 or 1-12, wherein the power reduction factor applied to the segment is achieved by a reduced transmission bandwidth.

Example 1-14: According to an example implementation of examples 1-10 to 1-13, wherein the message indicating the status further indicates a part of a bandwidth used by the first base station is used for physical downlink shared channel transmission.

Example 1-15: According to an example implementation of examples 1-1 to 1-14, wherein the message received from the user equipment indicating the measure of power received from signals in the set of beams emitted by the second base station further indicates a traffic demand requested by the user equipment; and wherein the determining that the measure of power is sufficient for the user equipment to be served by the second base station with a quality of service greater than the minimum quality of service is based on the traffic demand experienced by the user equipment.

Example 1-16: According to an example implementation of example 1-15, wherein determining that the measure of power is sufficient for the user equipment to be served by the second base station with a quality of service greater than the minimum quality of service includes comparing the traffic demand experienced by the user equipment to a traffic demand provided by the first base station.

Example 1-17: According to an example implementation of examples 1-1 to 1-16, wherein initiating the handover of the user equipment from the first base station to the second base station includes transmitting, to the user equipment, a message including a timer configuration indicating a time at which the user equipment is handed back over to the first base station after the handover to the second base station has been completed.

Example 1-18: According to an example implementation of examples 1-1 to 1-17, wherein determining that the measure of power is sufficient for the user equipment to be served by the second base station with a quality of service greater than the minimum quality of service includes training a machine learning engine to output the determination that the measure of power is sufficient for the user equipment to be served by the second base station based on previous reports from the user equipment indicating a measure of power received from signals in a set of beams emitted by a second base station.

Example 1-19: According to an example implementation of examples 1-1 to 1-18, wherein the measure of power includes a reference signal received power; and wherein determining that the measure of power is sufficient for the user equipment to be served by the second base station with a quality of service greater than the minimum quality of service.

Example 1-20: An apparatus comprising means for performing a method of any of examples 1-1 to 1-19.

Example 1-21: A computer program product including a non-transitory computer-readable storage medium and storing executable code that, when executed by at least one data processing apparatus, is configured to cause the at least one data processing apparatus to perform a method of any of examples 1-1 to 1-19.

Figure 6:
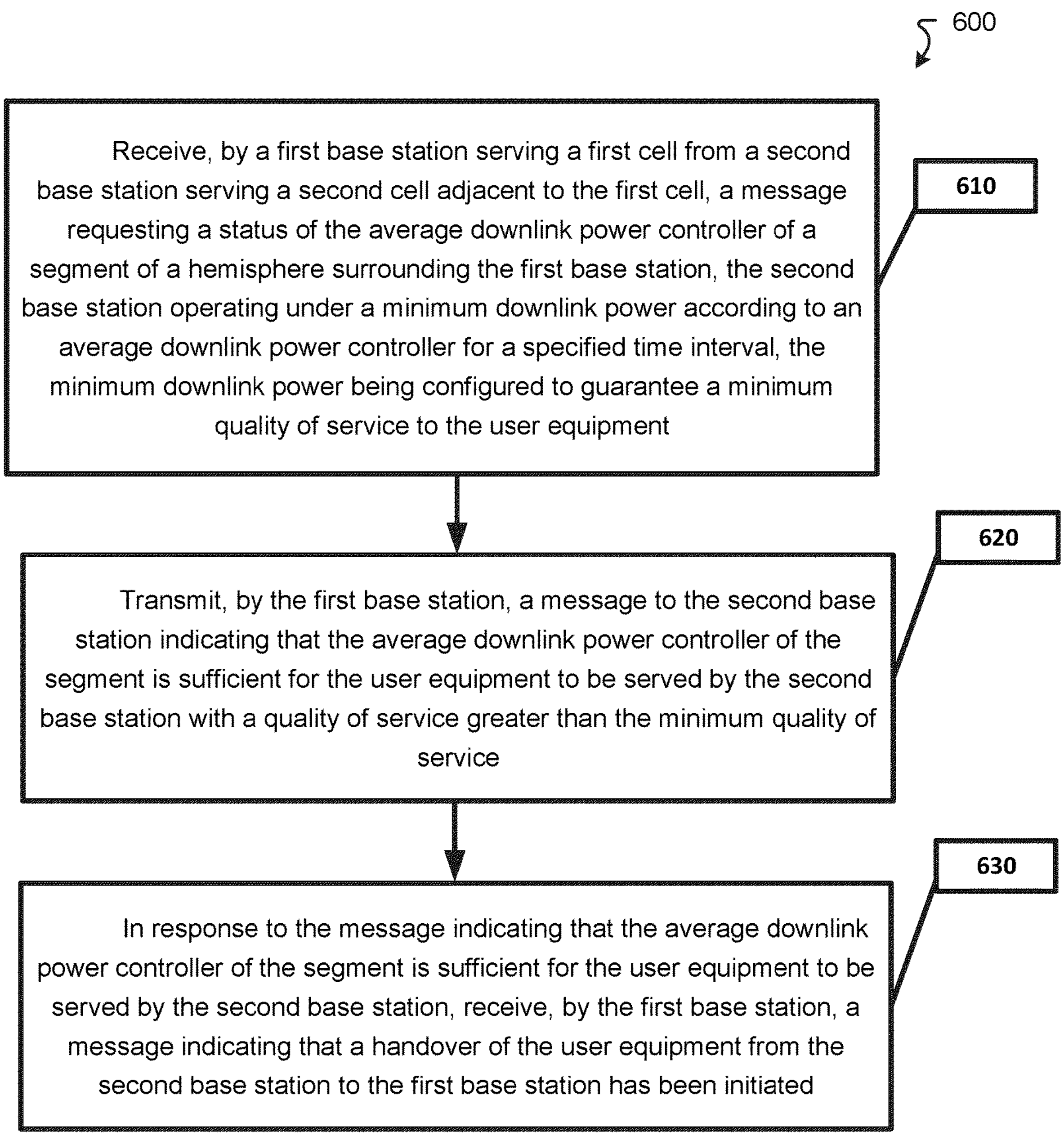
FIG. 6 is a flow chart illustrating a process of determining whether to hand over a user equipment to a new base station to improve QoS, according to an example implementation.

Example 2-1: FIG. 6 is a flow chart illustrating a process 600 of determining whether to hand over a user equipment to a new base station to improve QoS. Operation 610 includes receiving, by a first base station serving a first cell from a second base station serving a second cell adjacent to the first cell, a message requesting a status of the average downlink power controller of a segment of a hemisphere surrounding the first base station, the second base station operating under a minimum downlink power according to an average downlink power controller for a specified time interval, the minimum downlink power being configured to guarantee a minimum quality of service to the user equipment. Operation 620 includes transmitting, by the first base station, a message to the second base station indicating that the average downlink power controller of the segment is sufficient for the user equipment to be served by the second base station with a quality of service greater than the minimum quality of service. Operation 630 includes, in response to the message indicating that the average downlink power controller of the segment is sufficient for the user equipment to be served by the second base station, receiving, by the first base station, a message indicating that a handover of the user equipment from the second base station to the first base station has been initiated.

Example 2-2: An apparatus comprising means for performing a method of example 2-1.

Example 2-3: A computer program product including a non-transitory computer-readable storage medium and storing executable code that, when executed by at least one data processing apparatus, is configured to cause the at least one data processing apparatus to perform a method of example 2-1.

Figure 7:
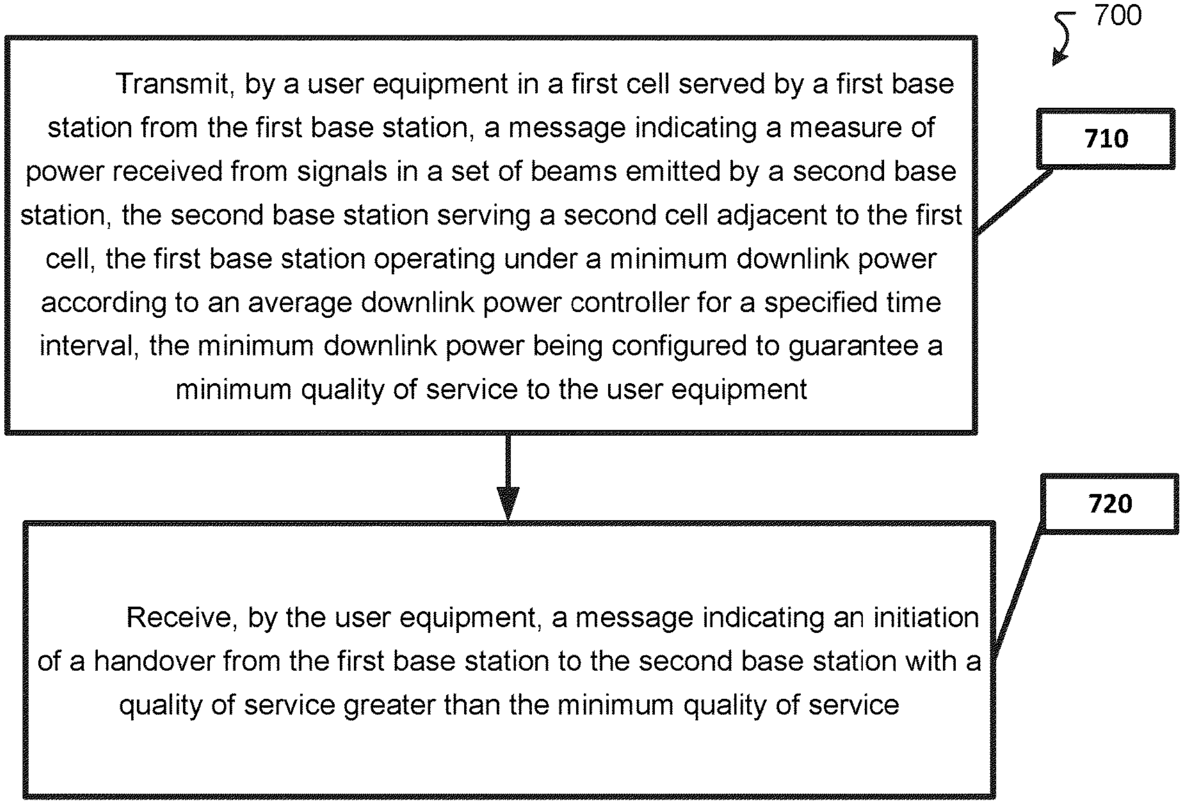
FIG. 7 is a flow chart illustrating a process of determining whether to hand over a user equipment to a new base station to improve QoS, according to an example implementation.

Example 3-1: FIG. 7 is a flow chart illustrating a process 700 of determining whether to hand over a user equipment to a new base station to improve QoS. Operation 710 includes transmitting, by a user equipment in a first cell served by a first base station from the first base station, a message indicating a measure of power received from signals in a set of beams emitted by a second base station, the second base station serving a second cell adjacent to the first cell, the first base station operating under a minimum downlink power according to an average downlink power controller for a specified time interval, the minimum downlink power being configured to guarantee a minimum quality of service to the user equipment. Operation 720 includes receiving, by the user equipment, a message indicating an initiation of a handover from the first base station to the second base station with a quality of service greater than the minimum quality of service.

Example 3-2: An apparatus comprising means for performing a method of example 3-1.

Example 3-3: A computer program product including a non-transitory computer-readable storage medium and storing executable code that, when executed by at least one data processing apparatus, is configured to cause the at least one data processing apparatus to perform a method of example 3-1

List of Example Abbreviations

Figure 8:
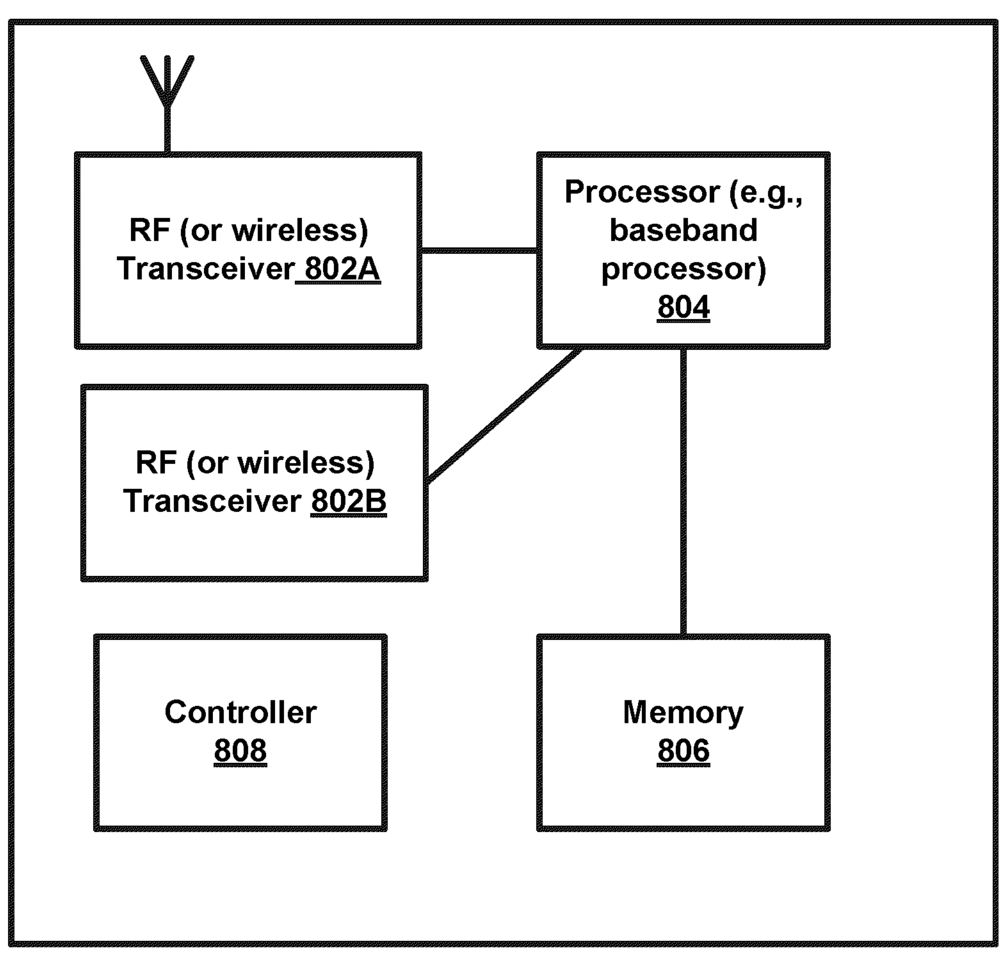
FIG. 8 is a block diagram of a node or wireless station (e.g., base station/access point, relay node, or mobile station/user device) according to an example implementation.

5G—5th Generation
gNB—5G/NR base station
NR—New Radio
RAN—Radio Access Network
UE—User Equipment
TRP—Transmission Reception Point
UL—Uplink
DL—Downlink
DCI—Downlink Control Information
MAC CE—Medium Access Control Control Element
PUCCH—Physical Uplink Control Channel
PUSCH—Physical Uplink Shared Channel
PDCCH—Physical Downlink Control Channel
PDSCH—Physical Downlink Shared Channel
TDM—Time Division Multiplexing
UCI—Uplink Control Information
SSB—Synchronization Signal Block
RS—Reference Signal FIG. 8 is a block diagram of a wireless station (e.g., AP, BS, e/gNB, NB-IoT UE, UE or user device) 800 according to an example implementation. The wireless station 800 may include, for example, one or multiple RF (radio frequency) or wireless transceivers 802A, 802B, where each wireless transceiver includes a transmitter to transmit signals (or data) and a receiver to receive signals (or data). The wireless station also includes a processor or control unit/entity (controller) 804 to execute instructions or software and control transmission and receptions of signals, and a memory 806 to store data and/or instructions.

Processor 804 may also make decisions or determinations, generate slots, subframes, packets or messages for transmission, decode received slots, subframes, packets or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8 such as controlling input/output devices (e.g., display, keypad), and/or may execute software for one or more applications that may be provided on wireless station 800, such as, for example, an email program, audio/video applications, a word processor, a Voice over IP application, or other application or software.

In addition, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IoT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall as intended in the various embodiments.

What is claimed is:

1. An apparatus, comprising:

at least one processor; and at least one memory including computer program code;

the at least one memory and the computer program code configured to cause the apparatus at least to:

receive, by a first base station serving a first cell from a user equipment within the first cell, a message indicating a measure of power received from signals in a set of beams emitted by a second base station, the second base station serving a second cell adjacent to the first cell, the first base station operating under a minimum downlink power according to an average downlink power controller for a specified time interval, the minimum downlink power being configured to guarantee a minimum quality of service to the user equipment;

determine, by the first base station, that the measure of power is sufficient for the user equipment to be served by the second base station with a quality of service greater than the minimum quality of service; and in response to the determining, initiate, by the first base station, a handover of the user equipment from the first base station to the second base station.

2. The apparatus as in claim 1, wherein the measure of power indicates the downlink power according to the average downlink power controller is a maximum allowed power over at least a portion of the time interval.

3. The apparatus as in claim 1, wherein the minimum downlink power according to the average downlink power controller is based on a minimum quality of service guaranteed to the user equipment to maintain a connection with the first base station.

4. The apparatus as in claim 1, wherein the at least one memory and the computer program code configured to cause the apparatus at least to:

transmit, to the second base station, a message requesting information concerning a segment of a hemisphere surrounding the second base station, over which the second base station transmits beams to the user equipment; and receive, from the second base station, a message identifying the segment over which the second base station emits the set of beams.

5. The apparatus as in claim 4, wherein the message identifying the segment indicates that the segment is static in time.

6. The apparatus as in claim 4, wherein the message identifying the segment indicates that the segment is dynamic in time.

7. The apparatus as in claim 6, wherein the message indicating that the segment is dynamic in time includes data representing an algorithm used to update the segments in time.

8. The apparatus as in claim 6, wherein the message indicating that the segment is dynamic in time includes data representing a schedule by which the segments are updated in time.

9. The apparatus as in claim 4, wherein the message identifying the segment indicates a first interval of polar angle over the hemisphere and a second interval of azimuthal angle over the hemisphere.

10. The apparatus as in claim 4, wherein the at least one memory and the computer program code configured to determine that the measure of power is sufficient for the user equipment to be served by the second base station is further configured to cause the apparatus at least to:

transmit, to the second base station, a message requesting a status of the average downlink power controller of the segment; and receive, from the second base station in response to the message, a message indicating the status of the average downlink power controller of the segment, the determination of the measure of power is sufficient for the user equipment to be served by the second base station with a quality of service greater than the minimum quality of service being based on the status of the average downlink power controller of the segment.

11. The apparatus as in claim 10, wherein the message indicating the status further indicates a power reduction factor applied to the segment.

12. The apparatus as in claim 11, wherein the message indicating the status further indicates a time interval over which the power reduction factor is applied to the segment.

13. The apparatus as in claim 11, wherein the power reduction factor applied to the segment is achieved by a reduced transmission bandwidth.

14. The apparatus as in claim 10, wherein the message indicating the status further indicates a part of a bandwidth used by the first base station is used for physical downlink shared channel transmission.

15. The apparatus as in claim 1, wherein the message received from the user equipment indicating the measure of power received from signals in the set of beams emitted by the second base station further indicates a traffic demand requested by the user equipment, and wherein the determining that the measure of power is sufficient for the user equipment to be served by the second base station with a quality of service greater than the minimum quality of service is based on the traffic demand experienced by the user equipment.

16. The apparatus as in claim 15, wherein the at least one memory and the computer program code configured to determine that the measure of power is sufficient for the user equipment to be served by the second base station with a quality of service greater than the minimum quality of service is further configured to cause the apparatus at least to:

compare the traffic demand experienced by the user equipment to a traffic demand provided by the first base station.

17. The apparatus as in claim 1, wherein the at least one memory and the computer program code configured to initiate the handover of the user equipment from the first base station to the second base station is further configured to cause the apparatus at least to:

transmit, to the user equipment, a message including a timer configuration indicating a time at which the user equipment is handed back over to the first base station after the handover to the second base station has been completed.

18. The apparatus as in claim 1, wherein the at least one memory and the computer program code configured to determine that the measure of power is sufficient for the user equipment to be served by the second base station with a quality of service greater than the minimum quality of service is further configured to cause the apparatus at least to:

train a machine learning engine to output the determination that the measure of power is sufficient for the user equipment to be served by the second base station based on previous reports from the user equipment indicating a measure of power received from signals in a set of beams emitted by a second base station.

19. The apparatus as in claim 1, wherein the measure of power includes a reference signal received power, and wherein the at least one memory and the computer program code configured to determine that the measure of power is sufficient for the user equipment to be served by the second base station with a quality of service greater than the minimum quality of service is further configured to cause the apparatus at least to:

compare the reference signal received power to a specified threshold.

20. An apparatus, comprising:

at least one processor; and at least one memory including computer program code;

the at least one memory and the computer program code configured to cause the apparatus at least to:

transmit, by a user equipment in a first cell served by a first base station from the first base station, a message indicating a measure of power received from signals in a set of beams emitted by a second base station, the second base station serving a second cell adjacent to the first cell, the first base station operating under a minimum downlink power according to an average downlink power controller for a specified time interval, the minimum downlink power being configured to guarantee a minimum quality of service to the user equipment; and receive, by the user equipment, a message indicating an initiation of a handover from the first base station to the second base station with a quality of service greater than the minimum quality of service.

21. A method, comprising:

transmitting, by a user equipment in a first cell served by a first base station from the first base station, a message indicating a measure of power received from signals in a set of beams emitted by a second base station, the second base station serving a second cell adjacent to the first cell, the first base station operating under a minimum downlink power according to an average downlink power controller for a specified time interval, the minimum downlink power being configured to guarantee a minimum quality of service to the user equipment; and receiving, by the user equipment, a message indicating an initiation of a handover from the first base station to the second base station with a quality of service greater than the minimum quality of service.

* * * * *